US012643781B2

(12) United States Patent
Ostenson

(10) Patent No.: US 12,643,781 B2
(45) Date of Patent: Jun. 2, 2026

(54) CONFIGURATION OF A MACHINE FOR ENGAGING A CAP WITH A CONTAINER

(71) Applicant: Tetra Laval Holdings & Finance S.A., Pully (CH)

(72) Inventor: Toni Ostenson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 19/109,170

(22) PCT Filed: Sep. 21, 2023

(86) PCT No.: PCT/EP2023/076076

§ 371 (c)(1),
(2) Date: Mar. 6, 2025

(87) PCT Pub. No.: WO2024/068425

PCT Pub. Date: Apr. 4, 2024

(65) Prior Publication Data

US 2026/0077989 A1 Mar. 19, 2026

(30) Foreign Application Priority Data

Sep. 29, 2022 (EP) .................................... 22198667

(51) Int. Cl.
*B67B 3/26* (2006.01)
*B65B 7/28* (2006.01)
*B67B 3/20* (2006.01)

(52) U.S. Cl.
CPC ............ *B67B 3/264* (2013.01); *B65B 7/2842* (2013.01); *B67B 3/20* (2013.01)

(58) Field of Classification Search
CPC ......... B67B 3/264; B67B 3/20; B67B 3/2006; B67B 3/2013; B67B 3/202; B67B 3/2026;
(Continued)

(56) References Cited

U.S. PATENT DOCUMENTS 5,321,935 A * 6/1994 Spatz ...................... B67B 3/208 53/53
5,400,564 A * 3/1995 Humphries ............... B67B 3/26 53/308
(Continued)

FOREIGN PATENT DOCUMENTS

| | | | |
|---|---|---|---|
| JP | H11124196 | A | 5/1999 |
| WO | 2016026035 | A1 | 2/2016 |
| WO | 2016177750 | A1 | 11/2016 |

OTHER PUBLICATIONS

International Search Report mailed Jan. 2, 2024, for International Application No. PCT/EP2023/076076.

*Primary Examiner* — Shelley M Self
*Assistant Examiner* — Katie L Gerth

(57) ABSTRACT

A control device performs a method for configuring a capping machine, which is operable to engage a threaded cap with a threaded neck of a container. In the method, angular positions, APs, are sequentially selected from a predefined set of APs of the cap, where each AP corresponds to an orientation of the cap relative to the neck. For each AP, a cap mounting test is performed, in which the capping machine is operated to engage a plurality of caps, arranged in the selected AP, with the neck on a respective container. The capping operations are evaluated for consistent capping performance. The method is performed until consistent capping performance is detected for a sequence of adjacent APs corresponding to a sequence of spatially adjacent cap orientations. The capping machine is then configured by setting its operational AP in relation to the sequence of adjacent APs.

15 Claims, 9 Drawing Sheets

(58) Field of Classification Search
CPC ..... B67B 3/2033; B67B 3/204; B67B 3/2046; B67B 3/2053; B67B 3/206; B67B 3/2066; B67B 3/2073; B67B 3/208; B67B 3/2086; B67B 3/2093; B65B 7/2842
See application file for complete search history.

(56) References Cited

U.S. PATENT DOCUMENTS

| | | | | |
|---|---|---|---|---|
| 6,874,301 | B2 * | 4/2005 | Kitamoto | B67B 3/26<br>53/484 |
| 7,024,837 | B2 * | 4/2006 | Takebe | B67B 3/26<br>53/317 |
| 9,417,145 | B2 * | 8/2016 | Cochran | G01N 21/909 |
| 10,508,012 | B2 * | 12/2019 | Ramnarain | B65B 7/2807 |
| 11,279,911 | B2 * | 3/2022 | Kamiya | C12M 23/46 |
| 11,486,780 | B2 * | 11/2022 | Forestelli | G06T 5/70 |
| 12,187,592 | B2 * | 1/2025 | Marchesi | B67B 3/2033 |
| 12,497,278 | B2 * | 12/2025 | Kim | B67B 3/208 |
| 2002/0148205 | A1 * | 10/2002 | Takebe | B67B 3/20<br>53/331.5 |
| 2002/0196434 | A1 * | 12/2002 | Takakusaki | B67B 3/264<br>356/240.1 |
| 2012/0174536 | A1 * | 7/2012 | Schwarz | B67B 3/264<br>53/317 |
| 2015/0033667 | A1 * | 2/2015 | Cirio | B67B 3/264<br>53/329 |
| 2018/0002074 | A1 * | 1/2018 | Berg | B67B 3/2066 |
| 2018/0086616 | A1 * | 3/2018 | Virgili | B67B 3/20 |
| 2018/0202802 | A1 * | 7/2018 | Angres | B67B 3/264 |
| 2022/0185546 | A1 * | 6/2022 | Berg | B65D 41/0485 |

* cited by examiner

CONFIGURATION OF A MACHINE FOR ENGAGING A CAP WITH A CONTAINER

TECHNICAL FIELD

The present disclosure relates to production of packages containing food products and, in particular, to a technique of configuring a capping machine, which is operable to screw a threaded cap onto a threaded neck of a container.

BACKGROUND

Within the food industry, it is common practice to pack liquid food in packages manufactured from paper-based laminates comprising a core layer of paper or paperboard and one or more barrier layers of, for example, plastic.

One common package type is manufactured by forming a sleeve of the above-described paper-based laminate, sealing one end of the sleeve to form a neck that defines a pouring spout, attaching a cap on the pouring spout, filling a liquid food product through the opposite open end of the sleeve, and sealing the open end to form a final package ready for distribution. This is only one example. There are many other types of paper-based laminate packages where caps are attached on a pouring spout.

The attachment of the cap is made in a capping machine, which is configured to rotate the cap so that threads on the cap engage firmly with corresponding threads on the neck. An example of such a capping machine is described in WO2016/177750.

Industrial production and packaging of liquid food is automated and involves advanced process control of machinery to achieve high-volume production. Safe and reliable operation is of great significance since operational failures and ensuing production standstills may have a profound impact on production cost and product quality. For example, it is vital to avoid operational failures that may damage machinery or lead to rejection of large production volumes of packages.

The capping operation is vulnerable to operational errors since incorrect attachment of the cap to the neck may result in damaged threads, insufficient sealing, leakage, etc. Such packages need to be rejected. Incorrect attachment may also cause consequential issues in downstream production, for example a need to clean a filling station of leaked food products.

Aforesaid WO2016/177750 proposes to determine a starting angle of the cap to be used when the cap is brought into engagement with the neck and to configure the capping machine to use this starting angle in production. The determination is done by performing a plurality of capping operations at different starting angles while seeking for a starting angle that results in poor capping performance. The machine is then configured to use a starting angle shifted by 60° in relation to the starting angle that results in poor capping performance. The underlying rationale is that poor capping performance occurs when thread ends on the cap meet thread ends on the neck. By shifting the starting angle by 60°, the thread ends on the cap should be arranged midway between the thread ends on the neck, assuming that the cap and the neck have three threads each where the starting points of the threads are separated by 120°.

However, it has been found that this blind shift from poor capping performance may fail to provide a proper starting angle to avoid incorrect attachment of the cap to the neck in production. There is thus a need for an alternative technique of configuring a capping machine.

SUMMARY

It is an objective to at least partly overcome one or more of the above-identified limitations of the prior art.

One such objective is to provide a technique of configuring a capping machine to screw a threaded cap onto a threaded neck of a container.

Another objective is to provide a technique of finding a proper starting angle for the cap in relation to the neck to mitigate the risk that the cap is incorrectly attached to the neck.

One or more of these objectives, as well as further objectives that may appear from the description below, are at least partly achieved by a computer-implemented method of configuring a capping machine, a computer-readable medium, and a control device as described herein, embodiments thereof being defined by the dependent claims.

A first aspect relates to a computer-implemented method of configuring a capping machine which, when configured, is operable to arrange a cap in a given angular position in relation to a neck on a container and to rotate the cap in relation to the neck to fully engage a threaded portion of the cap with a corresponding threaded portion of the neck. The method comprises: sequentially selecting an angular position from a predefined set of angular positions of the cap until a termination condition is fulfilled, wherein the angular positions in the predefined set correspond to different orientations of the threaded portion of the cap relative to the threaded portion of the neck; operating, for each selected angular position, the capping machine to perform a plurality of capping operations, in which each of a plurality of caps is arranged in the selected angular position and rotated to fully engage with a respective neck on a respective container; and evaluating the plurality of capping operations for consistent capping performance at the selected angular position. The termination condition requires detection of the consistent capping performance for a sequence of adjacent angular positions that correspond to a sequence of spatially adjacent orientations of the threaded portion of the cap relative to the threaded portion of the neck. The method further comprises: configuring the capping machine by setting the given angular position in relation to the sequence of adjacent angular positions.

The method of the first aspect performs an active search for consistent capping performance among a set of predefined angular positions. The active search is terminated when consistent capping performance is detected for a coherent range of the cap orientations that are represented by the sequence of adjacent angular positions. In other words, the sequence of adjacent angular positions define spatially consecutive steps in cap orientation relative to the neck on the container. Compared to the prior art, the method of the first aspect significantly reduces the risk that the capping machine outputs containers with incorrectly attached caps during production. The active search for a sequence of adjacent angular positions with consistent capping performance inherently results in a verification, with high probability, that there exists a coherent range of cap orientations that may be used for configuring the capping machine. The verification, in turn, makes it possible to configure the capping machine so as to achieve a stable and consistent capping performance in production. The method of the first aspect limits the consumption of containers and caps, since the search is automatically terminated when the termination condition is fulfilled. Thus, the search need not be performed for all of the predefined angular positions.

As used herein, “liquid food” refers to any food product that is non-solid, semi-liquid or pourable at room temperature, including beverages, such as water, fruit juices, wines, beers, sodas, as well as dairy products, sauces, oils, creams, custards, soups, pastes, etc., and also solid food products in a liquid, such as beans, fruits, tomatoes, stews, etc.

As used herein, “a package” refers to any package or container suitable for containment of liquid food products, including but not limited to containers formed of cardboard or paper-based laminate, and containers made of or comprising plastic material.

A second aspect relates to a computer-readable medium comprising program instructions, which when executed by processor circuitry, is configured to cause the processor circuitry to perform the method of the first aspect or any of its embodiments.

A third aspect relates to a control device which is configured to perform the method of the first aspect or any of its embodiments, the control device comprising a signal interface to provide control signals for operating the capping machine and receive an input signal indicative of capping performance.

Still other objectives, features, embodiments, aspects and advantages of the invention will appear from the following detailed description as well as from the accompanying schematic drawings.

DRAWINGS

DETAILED DESCRIPTION

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. Accordingly, the terms “a” and/or “an” shall mean “at least one” or “one or more”, even though the phrase “one or more” or “at least one” is also used herein. The terms “multiple”, “plural” and “plurality” are intended to imply provision of two or more elements. The term “and/or” includes any and all combinations of one or more of the associated listed elements. Although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like reference signs refer to like elements throughout.

Figure 1A:
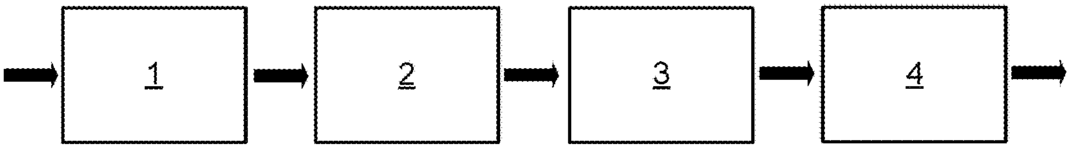
FIG. 1A is a schematic view of a sequence of processing stations in an example production line for manufacture of packages containing food products.

FIG. 1A schematically illustrates an example production line for production of sealed packages that contain liquid food. The production line comprises a sequence of stations 1-4. A sleeve forming station 1 is configured to re-shape a sheet material into a cylindrical package body (“sleeve”). The sheet material may be made of a paper-based laminate as discussed in the Background section. A top forming station 2 is configured to receive the sleeve from station 1 and provide a top portion on one open end of the sleeve, to form a container. The top portion comprises a threaded neck that defines an access opening. The neck is also denoted “finish” in the art. The access opening may or may not be covered by a membrane (foil). The neck is typically made of plastic material and may be incorporated into the top portion is different ways. In one implementation, for example as described in WO2007/106006, the top forming station 2 is configured to provide the entire top portion by injection molding. In another implementation, for example as described in DE102005048821 and WO2010/085182, the material of the sleeve is folded or otherwise manipulated to engage a ready-made neck element. After the top forming station 2, the container has an open end opposite to the end that is provided with the top portion. A capping station 3 is configured to receive the container from station 2 and screw a threaded cap onto the threaded neck. A filling station 4 is configured to fill liquid food into the container, through its open end, and then seal the open end to form a final package containing liquid food. The filling station 4 may also be configured to perform a sterilization of the package before the filling operation.

Although not shown in FIG. 1, any one of the stations 1-4 may be duplicated to operate in parallel to increase the throughput of the production line. Each station 1-4 may include one or more machines for performing the processing operations of the station. It is also conceivable that more than one station is implemented by a single machine.

The structure of the respective station 1-4 will not be described in detail since many implementations are available and well-known to the person skilled in the art. The present disclosure is related to a technique of configuring the capping station or machine 3. Thus, the method and capping station described herein may be used for any type of package where a cap is arranged on a neck of the package, i.e. regardless of how the package body and how the package neck are manufactured.

Figure 1B:
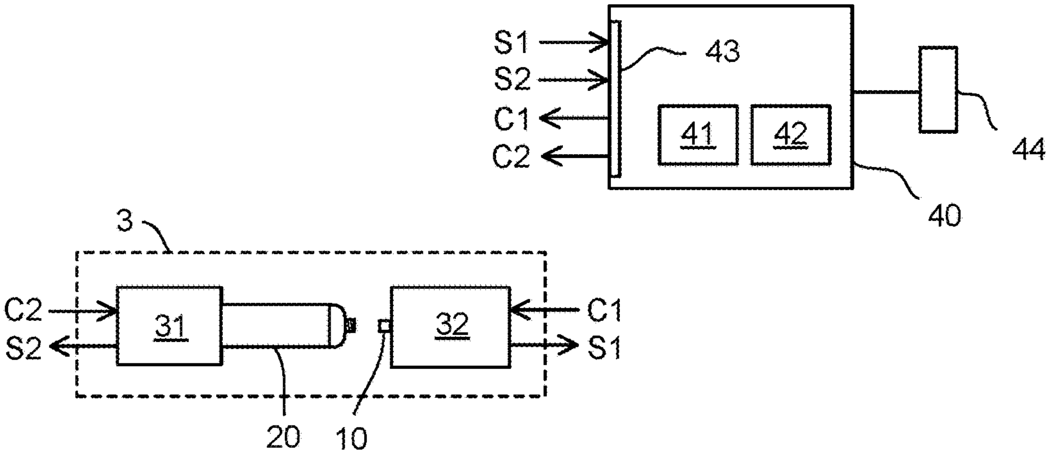
FIG. 1B is a schematic view of a capping machine in the production line of FIG. 1A.

A non-limiting example of a capping machine 3 is schematically shown in FIG. 1B. The capping machine 3 comprises a first manipulator 31, which is configured to receive and hold a container 20 produced by e.g. a top forming station 2, and a second manipulator 32, which is configured to hold and arrange a threaded cap 10 in relation to the threaded neck on the container 20 and rotate the cap 10 so that its threads engage with the threads on the neck. When the cap 10 has been rotated into engagement with the neck, the second manipulator releases the cap 10 and the first manipulator releases the container 20, e.g. for transportation to the filling station 4.

FIG. 1B also includes a control device 40, which is configured control the operation of the capping machine 3. The control device 40 may or may not be part of the machine 3. The control device 40 may be implemented by hardware or a combination of software and hardware. In the illustrated example, the control device 40 comprises processor circuitry 41, computer memory 42 and a signal interface 43. The processor circuitry 41 may, for example include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program comprising computer instructions may be stored in the memory 42 and executed by the processor circuitry 41 to perform methods and procedures as described in hereinbelow. The control program may be supplied to the control device 40 on a computer-readable medium, which may be a tangible (non-transitory) product (e.g. magnetic medium, optical disk, read-only memory, flash memory, etc.) or a propagating signal. The signal interface 43 may be configured in accordance with conventional practice to receive input signals and provide output signals. In the illustrated example, the control device 40 is further connected to a feedback device 44 which is configured to generate audible and/or visible feedback to an operator of the machine 3. For example, the feedback device 44 may comprise one or more of a display, an indicator lamp, a speaker, a siren, etc.

The operations of the manipulators 31, 32 are controlled by control signals from the control device 40, represented by C1, C2, based on input signals from the respective manipulator, represented by S1, S2. The manipulators 31, 32 may be configured in many different ways to perform their respective function and will not be described in detail. Examples are found in aforesaid WO2016/177750 and WO2007/106006.

Figure 2A:
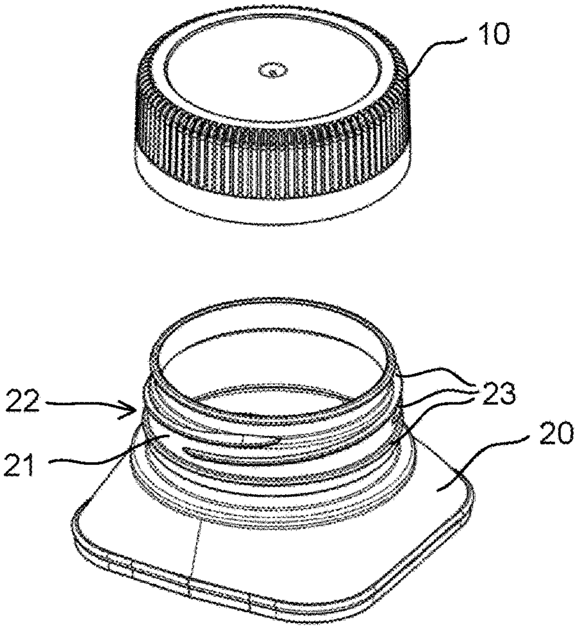
FIGS. 2A-2B are perspective views of a cap and a container before and after, respectively, a capping operation.
Figure 2B:
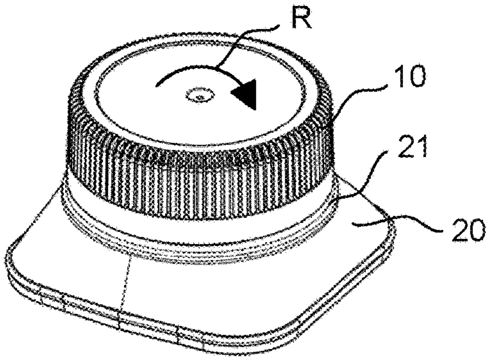

FIGS. 2A-2B are perspective views of a cap 10 before and after a capping operation. In FIG. 2A, the cap 10 is spaced from and aligned with the neck 21 on a container 20. In the illustrated example, the neck 21 has a threaded portion 22 comprising three threads 23. Although not shown in FIG. 2A, the cap 20 has three corresponding threads. In FIG. 2B, the cap 10 has been rotated in the direction of arrow R to engage its threads with the threads 23 on the neck 21.

As stated in the Background section, it is known that the starting orientation of the thread(s) on the cap in relation to the thread(s) on the neck is important for the outcome of the capping operation. This is further illustrated in FIGS. 3A-3B, which are side views of a cap 10, which is slid onto the neck (finish) 21 of a container 20 in two different starting orientations. Structures located inside the cap 10 are shown by thinned lines. As seen, the cap 10 defines an inner cavity 11, which is configured to receive the neck 21. The inner cavity 11 has a threaded portion 12 on a circumferential wall. The threaded portion 12 comprises one or more threads 13, which are configured in conformity with one or more threads 23 on the threaded portion 22 of the neck 21. The cap 10 is aligned with the neck 21, by a center/symmetry axis 10*a* of the cap 10 being aligned with a center/symmetry axis 21*a* of the neck 21.

Generally, a "thread" is a helical structure, which is wrapped around a cylinder or cone in the form of a helix. In the examples shown herein, the cap 10 defines one or more inner (female) threads 13, and the neck 21 defines one or more outer (male) threads 23. The respective thread 13, 23 has an externally facing thread end or thread tip 13*a*, 23*a*, from which the thread 13, 23 winds into the cap 10 and onto the neck 21, respectively. In the field of packages for liquid food, it is common to provide the cap 10 and the neck 21 with three threads each to limit the required rotation of the cap when it is to be removed from the package. The examples given herein all presume the provision of three threads. However, the disclosure is applicable to any number (n) of threads, $n \geq 1$.

Figure 3A:
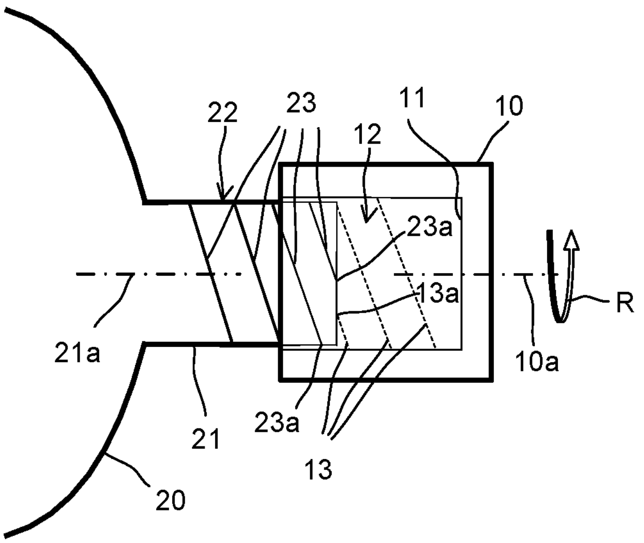
FIGS. 3A-3B are schematic side views, partly in section, of a cap with two different angular orientations of a thread end in relation to a thread end on a container.

In FIG. 3A, the cap 10 is arranged with a thread end 13*a* facing a gap between two thread ends 23*a* on the neck 21. Thereby, as the cap 10 is turned in the direction R, the thread end 13*a* will slide in between the thread ends 23*a*, and the thread 23 will be guided along the threads 13 until the cap 10 is firmly engaged with the neck 21.

Figure 3B:
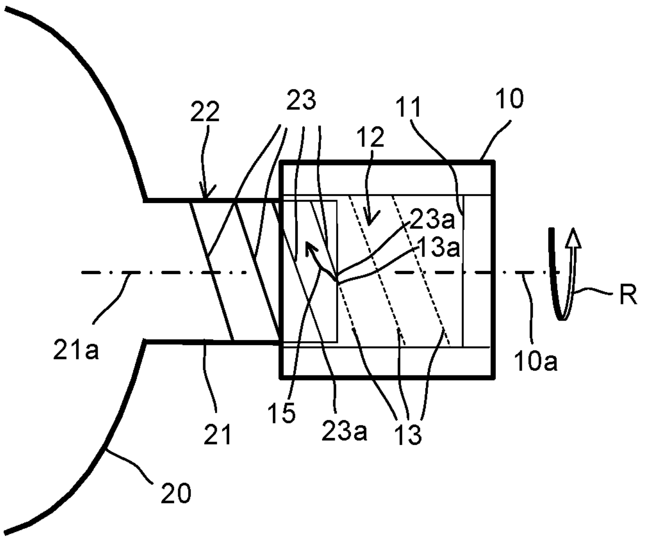

In FIG. 3B, the cap 10 is instead arranged with a thread end 13*a* facing a thread end 23*a* on the neck 21. Thereby, as the cap 10 is turned in the direction R, the thread end 13*a* may slide either to the left of the thread end 23A, as indicated by arrow 15, or to the right of the thread end 23A. Thereby, the orientation of the cap in FIG. 3B results in a capping instability. This instability may cause the cap to be incorrectly mounted on the neck. For example, the cap may be mounted askew on the neck. The incorrectly mounted cap may result in an insufficiently sealed container, damaged threaded portions on the neck and/or cap, or a final package that is too easy to open. Such final packages need to be discarded. Further, if leaks occur in the filling station 4, the production line may need to be shut down for cleaning, causing costly standstill of production.

The following disclosure relates to a technique of configuring a capping machine 3, specifically a technique for determining a proper starting orientation of the cap 10 in relation to the neck 21 of the container 20 so as to achieve a consistent capping performance of the capping machine 3 when the production line is operated to produce final packages. The technique is based on the fundamental insight that a search for a proper starting orientation of the cap should be designed to test the capping performance at different test orientations of the cap in relation to the neck and seek for a sequence of adjacent test orientations that all yield consistent capping performance. This sequence of adjacent test orientations will define a coherent range of cap orientations in which the capping machine is likely to operate properly.

The proper starting orientation is therefore selected from this range and the capping machine is configured accordingly. In the following, the test orientation of the cap is also denoted "starting angle" or "angular position", abbreviated AP.

Figure 4:
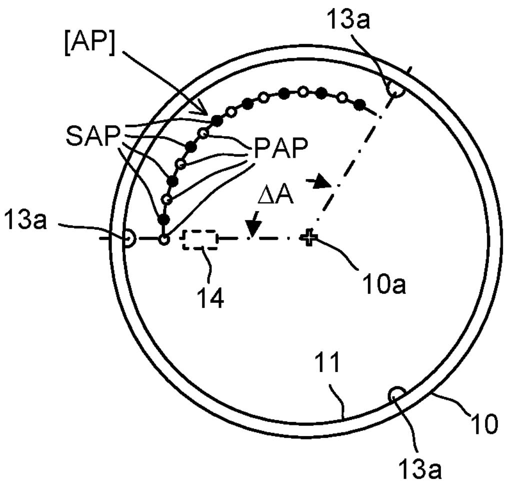
FIG. 4 is a bottom plan view of an example cap with three equally spaced thread ends.

FIG. 4 is a bottom plan view towards the cavity 11 of an example cap 10. The cap in FIG. 4 will be used to further explain and exemplify the configuration technique. The cap 10 comprises three inner threads, which are identical but shifted in the circumferential direction of the cap 10. Specifically, as shown in FIG. 4, the thread ends 13*a* are equidistantly distributed around the perimeter of the cap 10. The threads are not shown for clarity of presentation. The angular spacing (angular range), ΔA, between adjacent thread ends 13*a*, in relation to the center axis 10*a* of the cap 10, is 120° in this example with three threads. The skilled person understands that the starting orientation of the cap 10 only needs to be sought within ΔA, due to the symmetry of the thread ends 13*a*. FIG. 4 also shows, by reference sign [AP], a predefined set of test orientations within ΔA. Each test orientation is represented by a dot and corresponds to an angular position, AP, of the cap in relation to the neck on the container. In the illustrated example, 16 dots are equiangularly distributed within ΔA, resulting an angular spacing of 7.5° between adjacent dots. In some embodiments, described below with reference to FIGS. 8-10, the test orientations are classified into two different categories; PAP (open dots) and SAP (filled dots).

As shown in FIG. 4, the cap 10 comprises at least one reference element 14 (one shown), which has a known location in relation to the thread ends 13*a*. The reference element 14 is used to identify the location of the thread ends 13*a* on the cap 10 to the capping machine 13. Based on the reference element(s) 14, the capping machine 3 is operable to arrange the cap 10 with any selected angular position between its thread ends 13*a* and the thread ends 23*a* on the neck 21 of the container 20. This assumes that capping machine 3 is also operable to arrange the container 20 with a known orientation of its thread ends 13*a*. The reference element 14 may be a three-dimensional structure, which is configured to mate with a corresponding structure on a gripping element of the manipulator 32 (FIG. 1B). For example, the reference element 14 may be a projection/depression of a specific shape, which matches with a depression/projection of corresponding shape on the gripping element, thereby causing the cap to attain a predefined orientation on the gripping element. In another example, the reference element 14 is a visual marking, which is detected by the manipulator 32 and used for arranging the cap 10.

Figure 5:
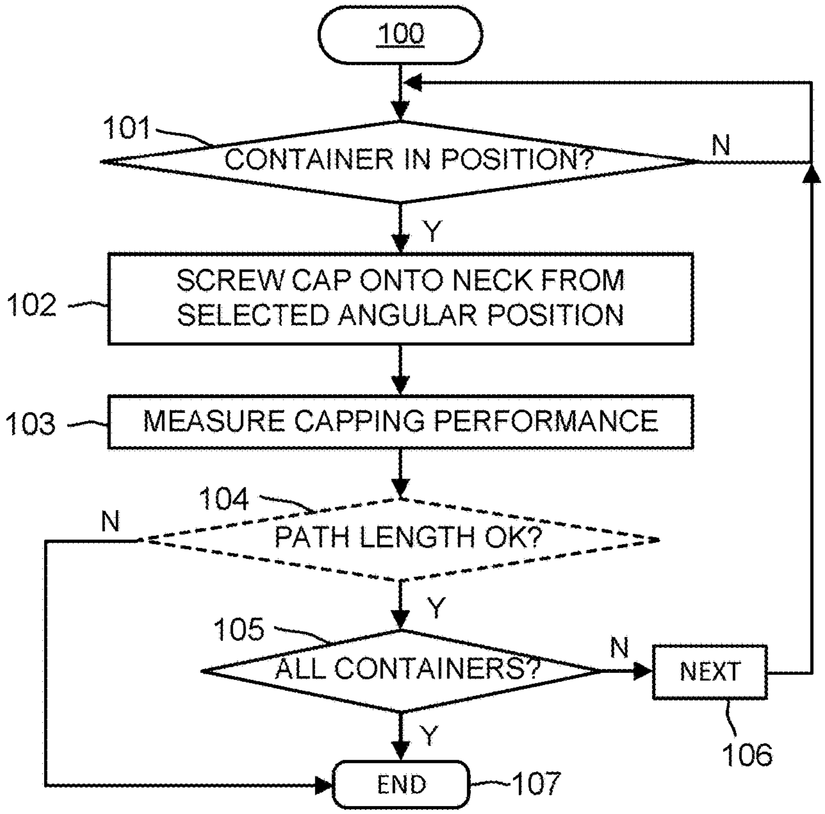
FIG. 5 is a flow chart of an example cap mounting test procedure.

FIG. 5 is a flow chart of a test procedure 100 which is performed to evaluate the capping performance for a selected test orientation of the cap. In the following, the procedure 100 is also denoted cap mounting test, abbreviated CMT. The procedure 100 may be implemented by the control device 40 (FIG. 1B), which is operated to receive input signals S1, S2 from and provide control signals C1, C2 to the capping machine 3 via the signal interface 43. During a CMT, the capping machine is operated to perform a plurality of capping operations at the selected test orientation and measure the capping performance for each capping operation. The number of capping operations is at least two, typically at least 5 or 10. Each capping operation consumes one cap and one container. The number of capping operations is a trade-off between obtaining sufficient data for a subsequent evaluation of the capping performance and limiting the consumption of containers and caps.

In step 101, the control device 40 waits for a container to be in position for capping. For example, in step 101, the control device 40 may wait until signal S2 (FIG. 1B) confirms that a container 20 is in position on the manipulator 31. Alternatively, the control device 40 may wait for a predefined time period in step 101.

In step 102, the capping machine 3 is operated to arrange a cap 10 in the selected test orientation and rotate the cap 10 to screw it onto the neck 21 of the container 20. The cap 10 is rotated for the purpose of fully engaging with the neck 21. Here, "fully engaging" implies that the cap 10 is rotated until it fulfils a predefined engagement criterion. In some embodiments, the cap is fully engaged with the neck when the torque acting on the cap 10, or equivalently on the container 20, during the cap rotation exceeds a predefined threshold. The torque may be given by or derived from a momentary drive power or drive current of a drive unit in the manipulator 32 (FIG. 1B), or from a dedicated torque sensor in the capping machine 3. Signal S1 may be indicative of the torque.

In step 103, the capping performance of step 102 is measured or otherwise quantified. Thus, step 103 results in one or more parameter values indicative of capping performance. In the following examples, capping performance is given by the parameter "rotation path length" (path length), which is to the total rotation of the cap from the selected test orientation until it is fully engaged. For example, the path length may be given in degrees (°) or any equivalent unit. In the following examples, the path length is set to a predefined maximum length value (MLV) if the cap fails to be fully engaged when the path length reaches the MLV. In the example of FIG. 1B, the path length is given by signal S1, which may be generated by the above-mentioned drive unit in the manipulator 32 or by a dedicated rotation sensor in the capping machine.

It may be noted that the capping performance may be quantified in other ways in step 103. In one example, the capping performance is evaluated by computer vision, based on digital images or video of the cap 10 and neck 21 during the capping operation, and graded according to a predefined scale. In another example, the cap is rotated in step 102 for a predefined time period or until it is fully engaged, and the capping performance is given by the maximum torque attained during the predefined time period.

In step 105, the control device checks if all capping operations have been performed. If not, the control device returns 106 to step 101 to wait for the next container to be in position for capping. If all capping operations have been performed, the CTM 100 ends 107.

Figure 11:
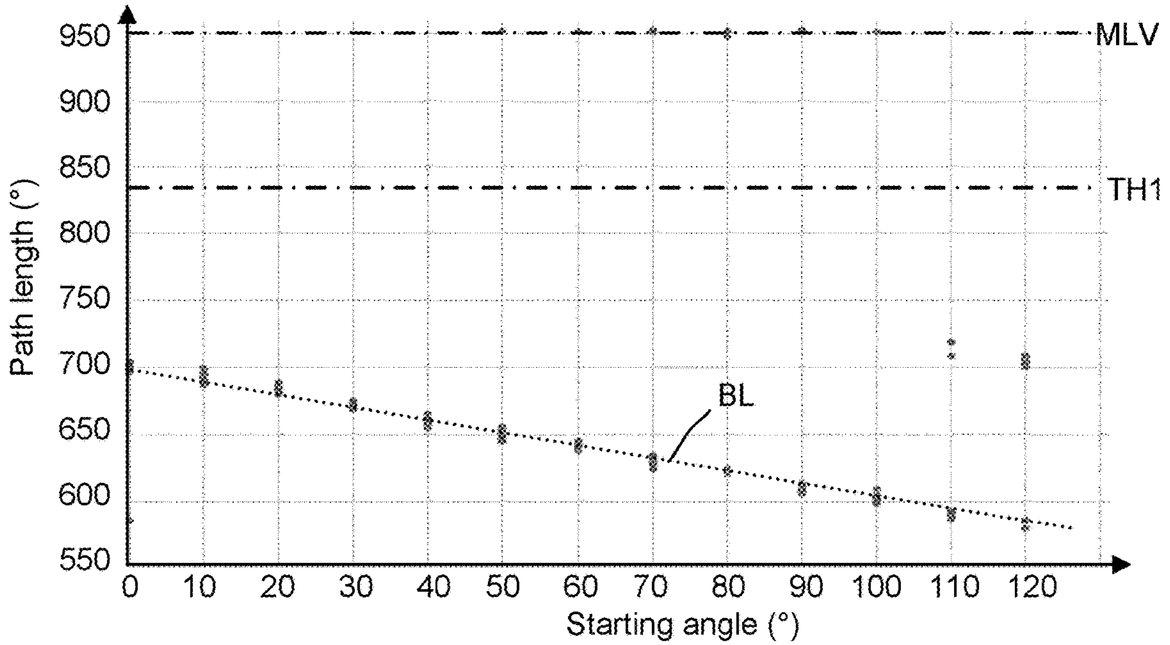
FIG. 11 shows a length threshold in relation to the measurement data in FIG. 6.
Figure 12:
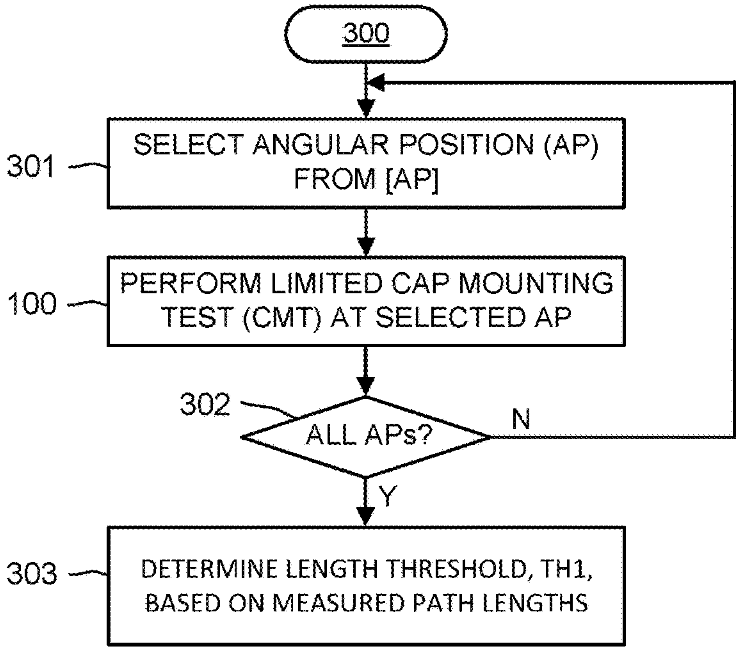
FIG. 12 is a flow chart of an example procedure for determining a length threshold.

As shown by dashed lines, the CMT 100 may include a step 104 which ends the CTM 100 if the path length during a capping operation is too long. The fast termination of step 104 will be further discussed below with reference to FIGS. 11-12.

Figure 6:
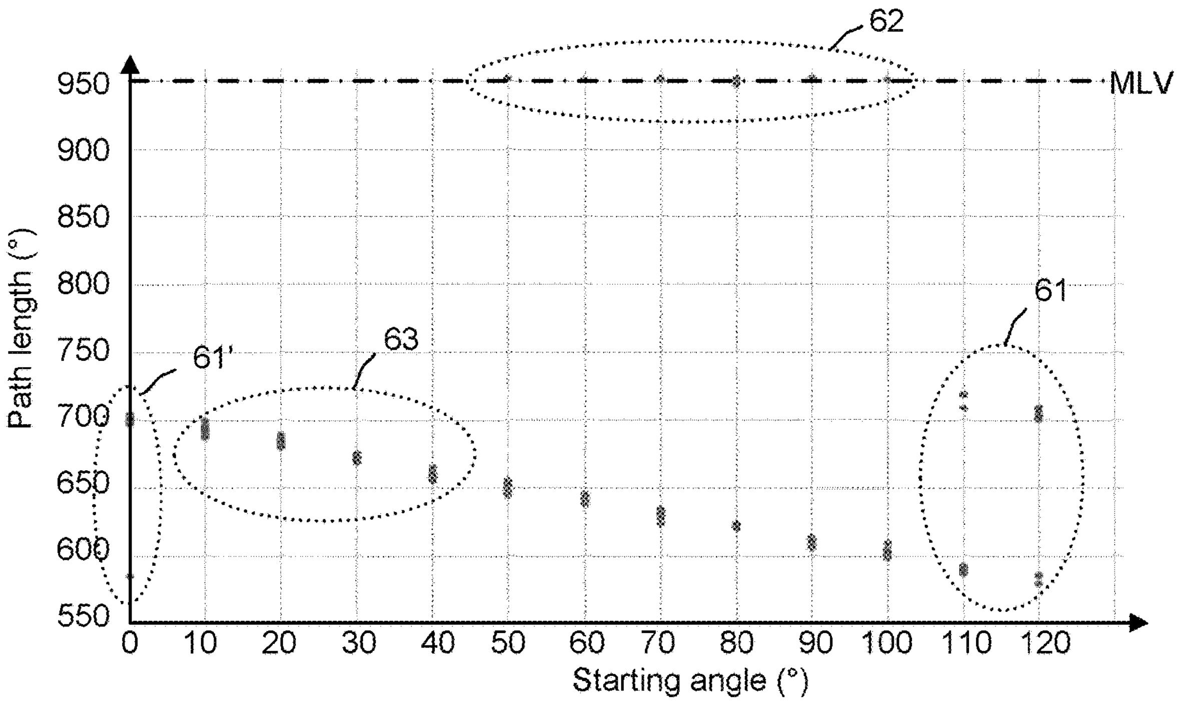
FIG. 6 is a graph of measurement data obtained during a cap mounting test procedure.

FIG. 6 is a graph of measurement data obtained by CMTs at test orientations ("starting angles") within an angular range from 0° to 120°, in steps of 10°. For each angle, the CMT includes ten capping operations. The measurement data is given as rotational path length in degrees (°). The measurement data may be separated into three different regions 61, 62, 63, as indicated by dotted lines. It may be noted that starting angle 0° is equivalent to starting angle 120° (cf. FIG. 4), so region 61' is redundant. In region 61, there is a bimodal distribution of path lengths at each test orientation, with some capping operations having a path length of about 580° and some having a path length of about 700°. Thus, region 61 exhibits an unstable capping performance. The bimodal distribution in region 61 is likely to occur when the thread ends on the cap and the neck meet, as illustrated in FIG. 3B. In region 62, there is another bimodal distribution of path lengths, with one group of path lengths being close to or at the maximum length value (MLV), which in this example is at 950°. Thus, region 62 also exhibits an unstable capping performance. In the illustrated example, some of the capping operations for each test orientation in region 62 have failed to fully engage the cap with the neck. This may occur if the threads on the cap "cog over" the threads on the neck. It is also believed that certain shapes of the top portion of the container may promote the occurrence of region 62, for example if the top portion is prone to be deformed when the cap is tightened onto the neck. Such a deformation may cause a prolonged path length. Region 63, on the other hand, exhibits stable capping performance. In the illustrated example, region 63 spans starting angles of 10°-40°.

From FIG. 6, it is realized why the prior art technique described in the Background section may fail. If poor capping performance is detected for a starting angle in region 61, a shift of 60° in starting angle will end up in region 62. If poor capping performance is detected for a starting angle in region 62, a shift of 60° in starting angle is likely to end up in region 61. The Applicant has developed a fundamentally different approach, by instead actively searching for a sequence of adjacent angular positions (APs) that result in stable capping performance, i.e. to actively identify at least part of the stable region 63. In the example of FIG. 6, region 63 includes a sequence of four such adjacent APs, at 10°, 20°, 30° and 40°. The sequence should include at least two adjacent APs, and preferably at least three adjacent APs to increase the certainty that the stable region 63 has been found. It should be noted that the search for APs with acceptable performance is made among a set of predefined APs (test orientations). This set is denoted "predefined set" and designated [AP] in the following. With reference to the test results in FIG. 6, the number of predefined APs is 12, extending from 0° to 110° with a spacing of 10°. Preferably, the predefined APs in [AP] span the angular range, ΔA (FIG. 4) to cover the complete range of relevant test orientations. The predefined APs may or may not be equidistantly distributed within ΔA. An equidistant distribution (equal angular spacing) is believed to be more efficient in detecting the stable region 63. Each AP corresponds to an orientation of the cap, and "sequence of adjacent APs" implies that the APs correspond to a sequence of spatially adjacent orientations of the cap. To emphasize the spatial relation, "adjacent APs" is used synonymously with "spatially adjacent APs" herein. In the example of FIG. 6, AP=10° and AP=30° are spatially adjacent to AP=20°. It is important to note that the angular positions wrap around at the end of the angular range, since AP=120° is equivalent to AP=0°. Thus, in FIG. 6, AP=100° and AP=0° are spatially adjacent to AP=110°.

Figure 7:
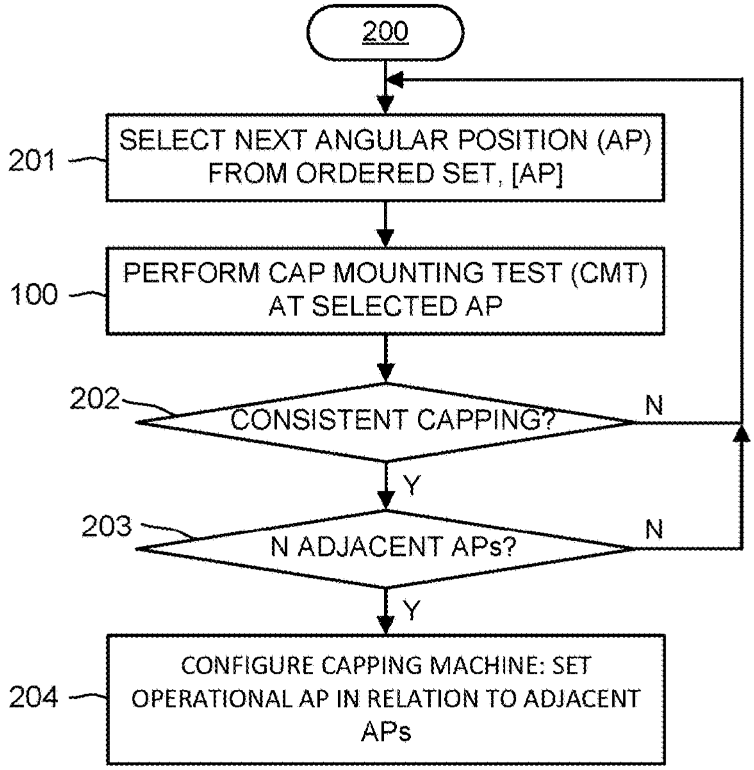
FIG. 7 is a flow chart of an example configuration method for a capping machine.

FIG. 7 is a flow chart of an example configuration method 200 in accordance with some embodiments. The method 200 is performed whenever a need to configure the capping machine arises, for example when the capping machine is started or re-started, after service or maintenance, when a new type of container/cap is to be processed, etc. The method 200 may be implemented by the control device 40 (FIG. 1B). In step 201, an AP is selected from the abovementioned predefined set, [AP]. The APs in [AP] are ordered and step 201 selects APs in accordance with the ordering. Thus, step 201 involves sequentially selecting an AP from [AP]. As will be seen, step 201 is repeated until a termination condition is fulfilled in step 203 (below). After step 201, the method 200 proceeds to perform a CMT 100 at the selected AP, for example in accordance with FIG. 5. Thus, the CMT 100 results in parameter values indicative of the capping performance for a plurality of capping operations at the selected AP. In step 202, the capping performance is evaluated for detection of consistent capping performance, abbreviated CCP. As used herein "consistent capping performance" implies a sufficiently low variability in the parameter values produced by the CMT 100. In the following description, the parameter value is path length and CCP is detected when the variability of the path lengths is below a variability threshold. The variability may be given by any suitable metric, including but not limited to variance, standard deviation, range, interquartile range, coefficient of variation, sum of absolute deviations, mean absolute deviation, etc. If step 202 fails to detect CCP, the method returns to step 201, in which the next AP is selected from [AP]. If step 202 detects CCP, the method proceeds to step 203, in which a termination condition is evaluated. The termination condition requires detection of CCP for a sequence of N spatially adjacent APs, with N≥2. As will be described further below, the termination condition may include additional criteria. If the termination condition is not fulfilled, the method returns to step 201. If fulfilled, the method proceeds to step 204 in which the capping machine is configured by setting an operational AP, to be used as starting angle of the cap when the capping machine is operated in production. The operational AP is set in relation to the sequence of N spatially adjacent APs, typically within the range of APs spanned by the sequence. For example, the operational AP may be set to an average or median of the APs in the sequence or to one of the APs in the sequence.

It may be noted that the ordering of APs in the predefined set [AP] defines the search order of the method 200 and thus the order in which APs are searched for detection of CCPs. In one example, the APs are arranged in random order in [AP]. In another example, the APs are arranged in [AP] to represent consecutive spatial orientations of the cap. This may be achieved by arranging APs by increasing or decreasing magnitude, for example from 0° to 110° in FIG. 6. However, the ordering may start from another AP and account for the wrapping of APs, for example 30°, . . . , 110°, 0°, . . . , 20° in FIG. 6.

In some embodiments, step 203 may further require that the sequence of N spatially adjacent APs spans a predefined width (angular subrange) for the termination condition to be fulfilled. This will increase certainty that a stable region (63 in FIG. 6) is indeed being detected. The predefined width may be set in the range of about 5%-50% of the angular range, ΔA. In some embodiments, the predefined width is set in the range of 10%-40%. The predefined width should be set to be less than the expected width of the stable region, which would be approximately 40° in the example of FIG. 6.

Figure 8:
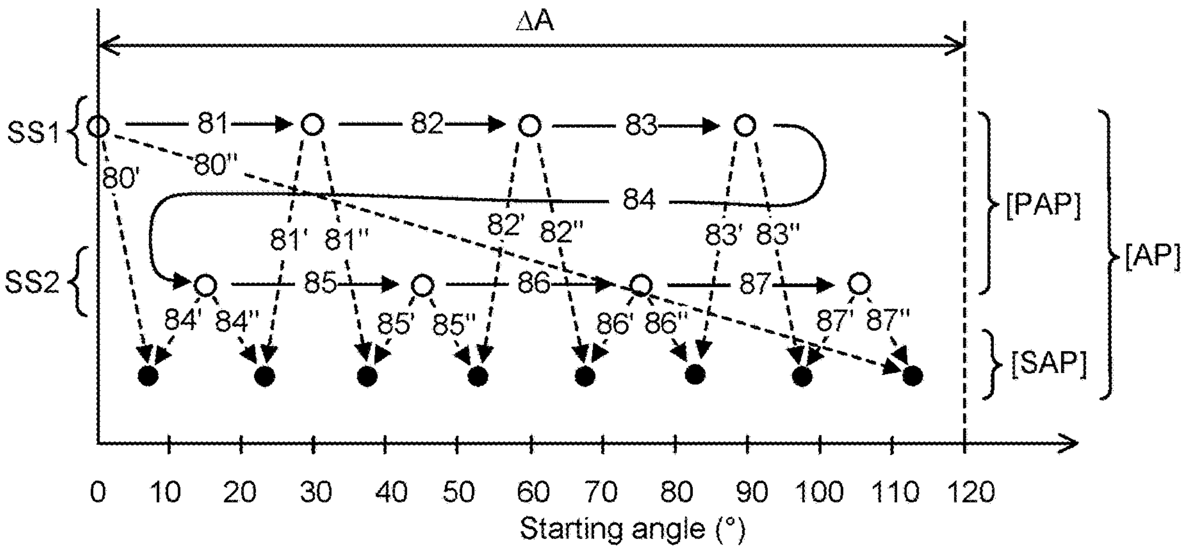
FIG. 8 is graph of example cap orientation angles used in the method of FIG. 7.

Every CMT that is performed by the method 200 consumes containers and caps. It is thus desirable to minimize the number of CMTs. This may be achieved by clever ordering and use of the predefined set, [AP], to achieve a more efficient search for the stable region. In some embodiments, [AP] is defined to include a first subset of primary angular positions, PAPs, and second subset of secondary angular positions, SAPs, which are dispersed intermediate the PAPs. In the context of FIG. 7, step 201 is implemented to sequentially select APs among the PAPs in first subset. When a CCP is detected in step 202, at least one SAP is selected from the second subset, the selected SAP(s) being spatially adjacent to the selected PAP, whereupon CMT is performed for each selected SAP. Step 203 then terminates the method if CCP is detected at each selected SAP, otherwise the method returns to step 201 to select the next PAP from the first subset. This search method is graphically illustrated in FIG. 8, in which open dots represent PAPs and filled dots represent SAPs. The dots in FIG. 8 correspond to the dots in FIG. 4. The first and second subsets are designated by [PAP] and [SAP], respectively. In the illustrated example, the APs are distributed with equal spacing within ΔA, and each PAP has two neighboring SAPs; one smaller and one larger. In FIG. 8, solid arrows 81-87 designate the ordering of the PAPs in [PAP], and dashed arrows with primed (') and double-primed (") numbers designate the neighboring SAPs that are associated with the respective PAP. In the illustrated example, PAP=0° is the first selected AP. If CCP is detected for PAP=0°, a respective CMT is performed for at least one of SAP=7.5° and SAP 112.5°, as indicated by arrows 80', 80". If CCP is not detected for the SAP(s), PAP=30° is selected, and so on.

Based on the foregoing, it is realized that the selection of SAPs is conditioned by detection of a CCP for a PAP. This means that fewer CMTs need to be performed when searching ΔA for detection of a stable region. It is currently believed that, depending on the configuration of the capping machine, the container and the cap, there should be 4-12 PAPs in the predefined set to provide a sufficient coverage of ΔA. In the example of ΔA=120° and equidistant PAPs, this corresponds to a spacing of 10°-30° between spatially adjacent PAPs. In FIG. 8, the spacing between spatially adjacent PAPs is 15°.

In the example of FIG. 8, there is one SAP between each pair of spatially adjacent PAPs, so that each PAP has two neighboring SAPs, one on each side. It is conceivable that there are more than one neighboring SAPs on one or both sides of the respective PAP. The SAPs may or may not be uniformly distributed between the PAPs. It may be advantageous to match the distribution of PAPs and SAPs to the termination condition. For example, if the termination condition stipulates N=3, i.e. CCP should be detected for three spatially adjacent APs, it may be beneficial to have one SAP between each pair of PAPs, as in FIG. 8. If the termination condition stipulates N=5, it may be beneficial to have two SAPs between each pair of PAPs. Generally, if N≥3, efficient detection of the stable region may be achieved by defining the termination condition to require detection of CCP at a PAP as well as at one or more SAPs on both sides of the PAP. In the example of FIG. 8, this corresponds to detecting CCP at an open dot and at the two filled dots that are indicated by the dashed arrows from this open dot.

As understood from FIG. 8, the PAPs need not be ordered strictly by magnitude in [PAP]. The ordering shown in FIG. 8 is designed to further speed up the search for a stable region. According to this ordering, [PAP] comprises a first subsequence SS1 of PAPs ordered by magnitude, and a second subsequence SS2 of PAPs which are interleaved with the PAPs of SS1 and ordered by magnitude, with SS2 being subsequent to SS1 in [PAP]. As shown by the solid arrows 81-87, this results in two consecutive scans of ΔA at different PAPs. Effectively, the first scan skips every second PAP, and the second scan is then made for the skipped PAPs. In a variant, more than one PAP may be skipped in the first scan. It is currently believed that the "jump" between PAPs in the first scan, which is given by the spacing of PAPs in SS1, should be less than the expected width of the stable region.

As further shown in FIG. 8, the PAPs in SS1 and SS2 are both ordered by increasing magnitude. This means that the first and second scans are made in the same direction across ΔA. Although the underlying reason is not fully understood, this has been found to speed up the search for a stable region. This is also true when the PAPs in SS1 and SS2 are both ordered by decreasing magnitude.

It is important to note that the separation of [PAP] into SS1 and SS2 is an optional feature. Adequate results may also be achieved by other orderings of [PAP], for example increasing or decreasing magnitude, random ordering, etc.

Figure 9:
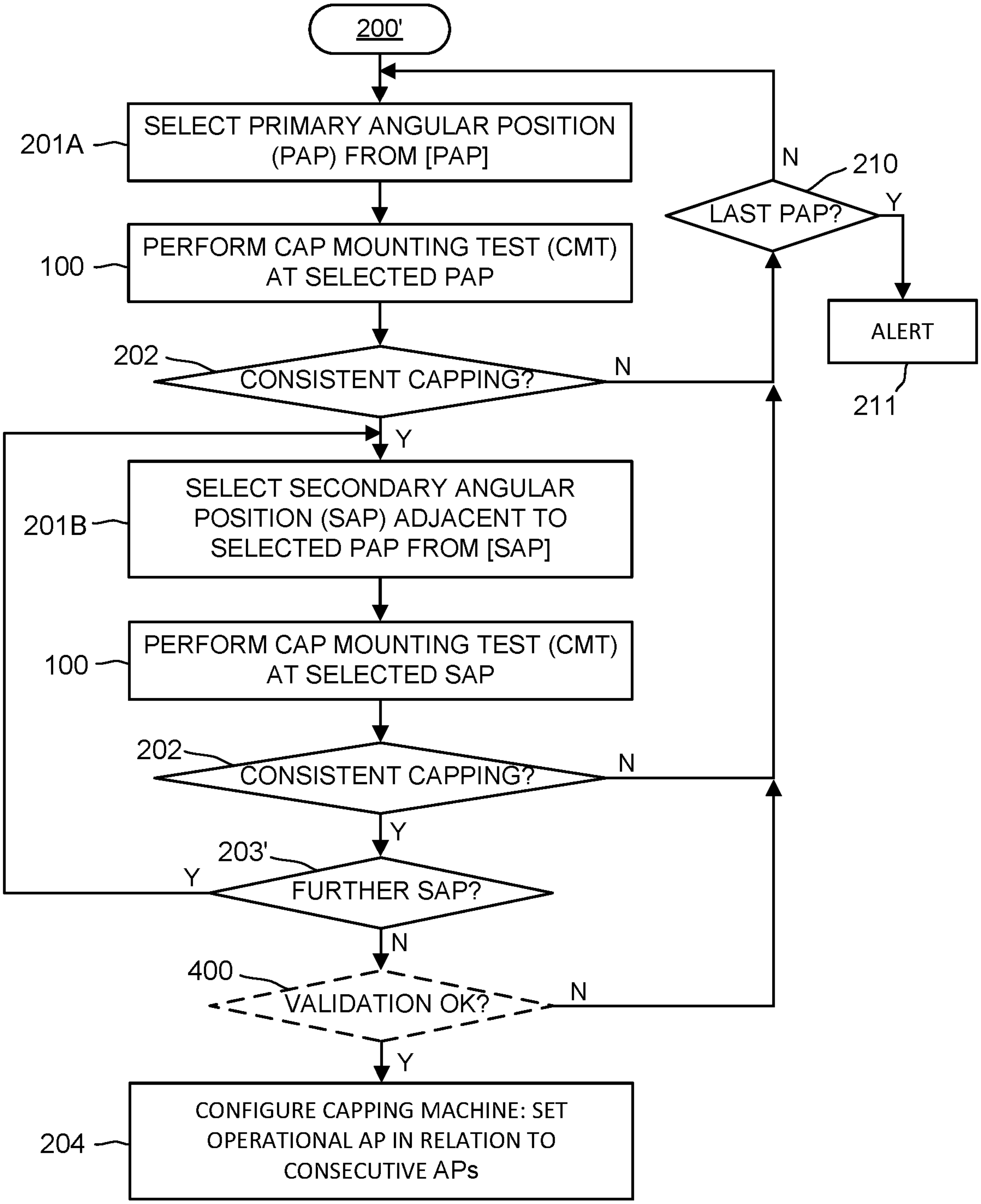
FIG. 9 is a flow chart of an example configuration method for a capping machine.

FIG. 9 is a flow chart of a configuration method 200' that implements the use of PAPs and SAPs as described in the foregoing. The method 200' may be performed by the control device 40 (FIG. 1B). In step 201A, by analogy with step 201 in FIG. 7, a PAP is selected from [PAP] in accordance with its ordering. The method then proceeds to perform CMT 100 at the selected PAP. Step 202 evaluates the parameter values measured in the CMT for detection of CCP. If step 202 fails to detect CCP, the method returns to step 201A, in which the next PAP is selected from [PAP]. As shown, step 210 may be performed to check if there are PAPs left in [PAP] and cause an alert to be generated if all PAPs have been processed (step 211). The alert may be generated by activating the feedback device 44 (FIG. 1B). If step 202 detects CCP, the method proceeds to step 201B. In step 201B, an SAP is selected from [SAP]. The selected SAP is spatially adjacent to the latest selected PAP. The method then proceeds to perform CMT 100 at the selected SAP. Step 202 evaluates the parameter values measured in the latest CMT for detection of CCP. If step 202 fails to detect CCP, the method returns to step 201A. If step 202 detects CCP, the method proceeds to step 203' to check if CCP has been found for a sufficient number N of spatially adjacent APs. If not, step 203' proceeds to step 201B, in which another spatially adjacent SAP is selected from [SAP]. When CCP has been found for a sufficient number N of adjacent APs, step 203' proceeds to step 204. In step 204, the capping machine is configured as described hereinabove. It is realized that step 203' corresponds to evaluation of a termination condition. As shown, the method 200' may also include a validation step 400 to be performed after step 203'. If the validation fails, the method returns to step 201A. If the validation succeeds, the method proceeds to step 204. Step 400, which also corresponds to evaluation of a termination condition, will be described further below with reference to FIGS. 13-14.

Figure 10A:
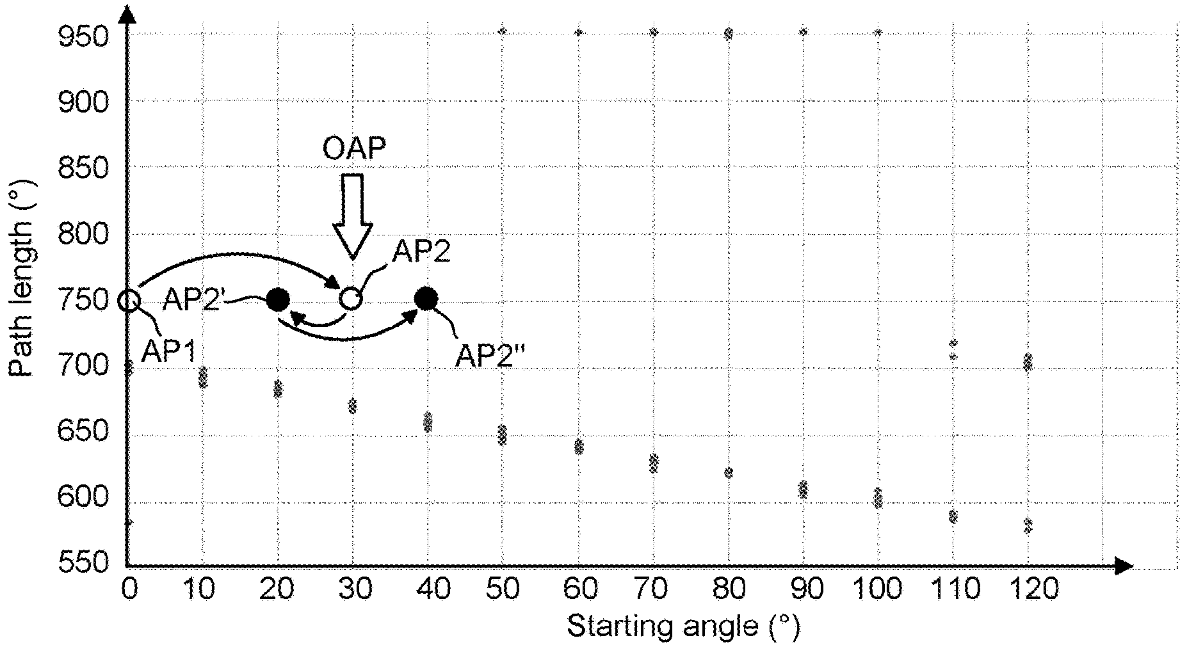
FIGS. 10A-10B show examples of the operation of the configuration method in FIG. 9 when using the cap orientation angles in FIG. 8 in the context of FIG. 6.

The operation of the method 200' is further illustrated in FIG. 10A in relation to the measurement data in FIG. 6. Here, it is assumed that PAPs have a spacing of 30° and have the following ordering in [PAP]: 0°, 30°, 60°, 90°, 15°, 45°, 75°, 105°, and that each PAP has two neighboring SAPs, shifted by −10° and +10°, respectively. It is also assumed that the termination condition requires three spatially adjacent APs to result in CCP (N=3). At PAP=0° (AP 1), CMT results in path lengths with a bimodal distribution, resulting in a variability that exceeds the variability threshold. Thus, no CCP is found at PAP=0°. Next, as indicated by a solid arrow, CMT is performed at PAP=30° (AP2). Here, the variability is below the variability threshold and CCP is found. Therefore, CMT is performed at SAP=20° (AP2'). Here, CCP is also found. Since N=3, CMT is also performed at SAP=40° (AP2"). Since CCP is found at AP2, AP2' and AP2", a stable region has been detected and the operational AP (OAP) is set within the stable region, in this example at 30° (AP2).

Figure 10B:
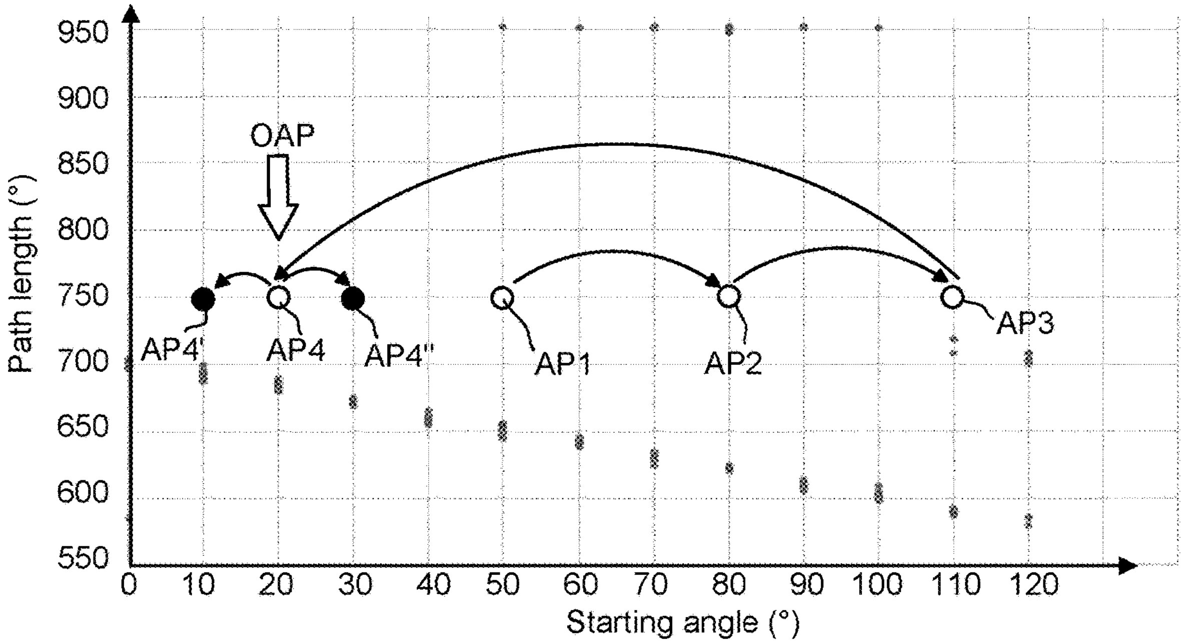

FIG. 10B shows another example of the operation of the method 200' in relation the measurement data in FIG. 6. Here, it is assumed that PAPs have the following ordering in [PAP]: 50°, 80°, 110°, 20°, 65°, 95°, 5°, 35°, and that each PAP has two neighboring SAPs, shifted by −10° and +10°, respectively. It is also assumed that the termination condition requires N=3. As seen, no CCP is found at PAP=50° (AP1), PAP=80° (AP2), or PAP=110° (AP3). At PAP=20° (AP4), CCP is found, and also at SAP=10° (AP4') and SAP=30° (AP4"). Since CCP is found at AP4, AP4' and AP4", a stable region has been detected and OAP is set within the stable region, in this example at 20° (AP4).

Reverting to FIG. 5, the CMT 100 may include a fast termination step 104, which serves to further speed up the search for a stable region and reduce the consumption of containers and caps. Step 104 checks if the respective path length determined by step 103 for a capping operation exceeds a length threshold, TH1. If so, the CMT is terminated. The rationale behind step 104 is that if a selected AP results in an excessive path length, it cannot be in a stable region. The location of TH1 is exemplified in FIG. 11. The skilled person realizes that the path length for a proper capping operation is inherently changed with cap orientation. This is represented as a changing baseline, BL, for the path length in FIG. 11. TH1 should be located well above BL and well below the maximum length value (MLV) that is assigned to non-engaged caps.

As an alternative to the fast determination step 104, the evaluation step 202 in the configuration method 200, 200' may apply TH1 when detecting CCP, by requiring all measured path lengths to be below TH1. Thus, in one example, CCP is detected only if the variability in measured path lengths at a selected AP is below a variability threshold, and all measured path lengths at the selected AP are below the length threshold, TH1.

In some embodiments, TH1 is given as a predefined value. In other embodiments, TH1 is determined by an initial calibration procedure or operation 300 exemplified in FIG. 12. The procedure 300 may be performed by the control device 40 (FIG. 1B). In step 301, an AP is selected from the predefined set [AP]. After step 301, a limited CMT 100 is performed at the selected AP. To limit the consumption of containers and caps, the limited CMT 100 comprises a smaller number of capping operations than the CMT 100 that is performed during the method 200, 200'. For example, the limited CMT 100 may involve 1-3 capping operations. Steps 301 and 100 are repeated, through step 302, until all APs in [AP], or a predefined subset of [AP], have been selected. Then, in step 303, TH1 is determined based on the path lengths that have been measured for the respective capping operation during the limited CMT (cf. step 103 in FIG. 5). Step 303 may be implemented in many different ways to locate TH1 between BL and MLV (FIG. 12), for example by histogram analysis.

The procedure 300 is an implementation of an initial calibration operation in which the capping machine is operated to perform at least one capping operation at each of the AP in [AP], or a subset thereof, and the length threshold, TH1, is determined based on the path lengths of the caps during the initial calibration operation.

Figure 13:
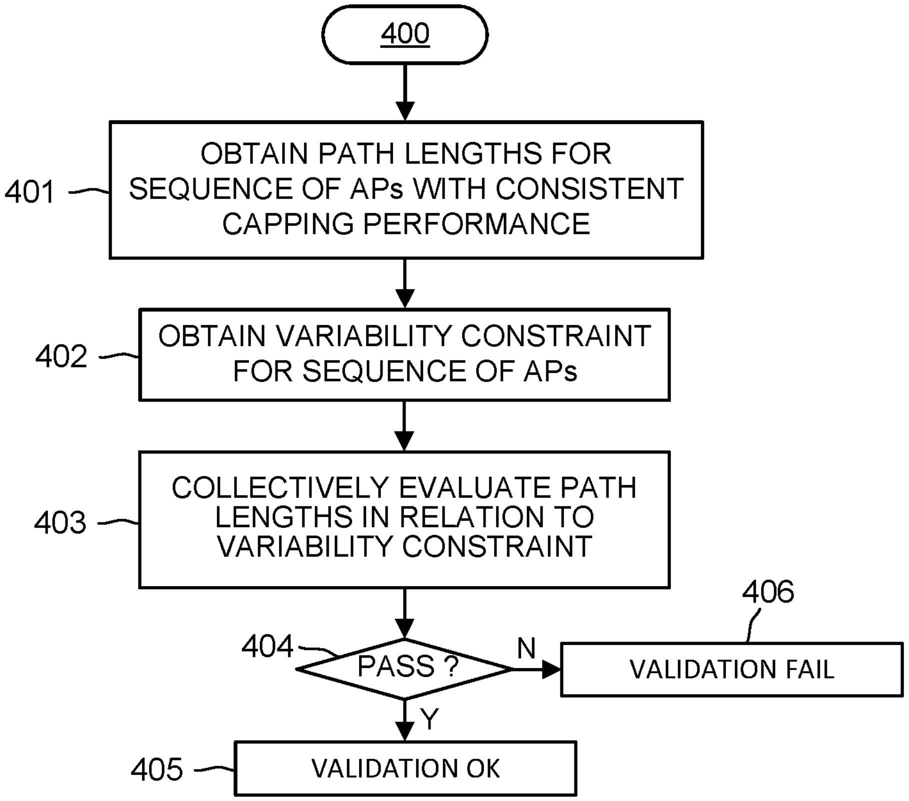
FIG. 13 is a flow chart of an example validation procedure for use in the method of FIG. 9.
Figure 14A:
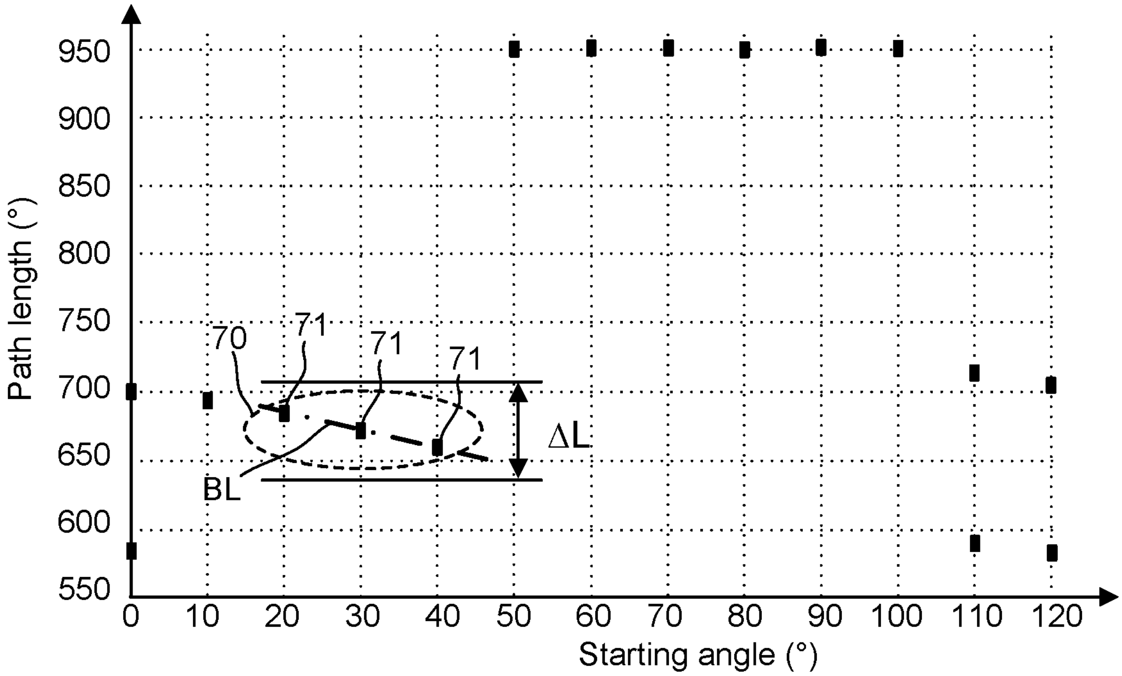
FIGS. 14A-14B show examples of the operation of a validation procedure.
Figure 14B:
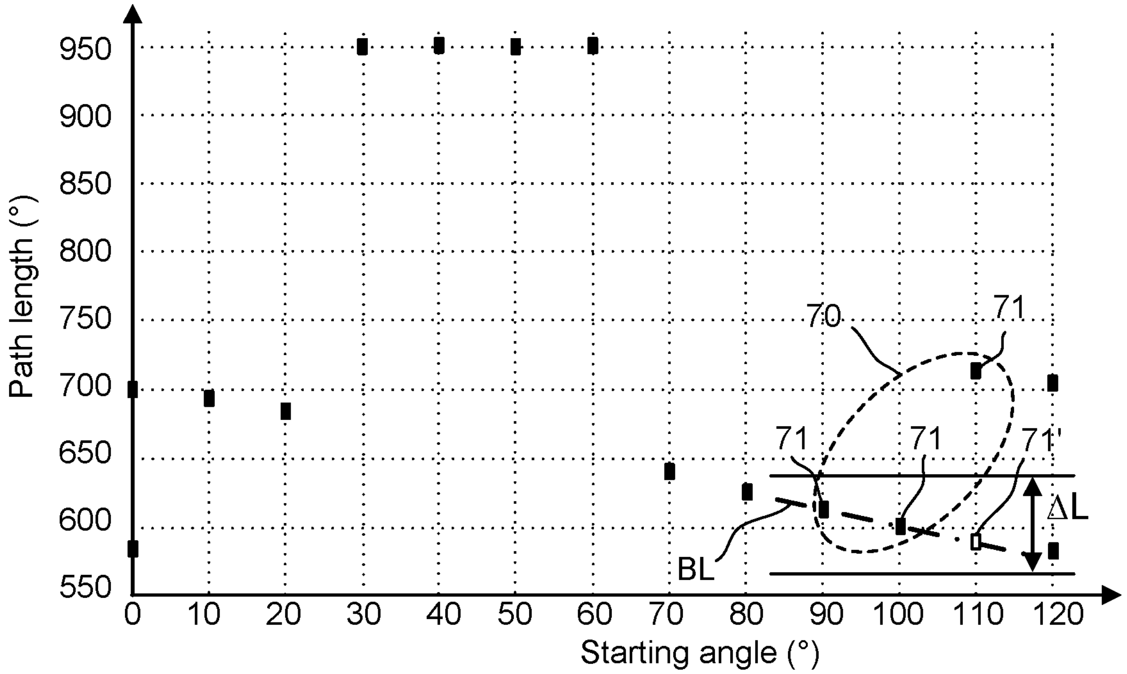

FIG. 13 is a flow chart of an example of a validation 400 that may be performed as part of the method 200, 200', as exemplified in FIG. 9. The validation 400 is optional and may be implemented to improve the certainty of detecting a stable region. Before describing the validation 400, reference is made to FIG. 14A which is a graph of measured path lengths as a function of AP. Thus, if a respective CMT is performed at AP=20°, AP=30° and AP=40°, the resulting distribution of path lengths are represented by filled rectangles 71. The variability in path lengths is low at each rectangle 71, and a stable region 70 may be identified by the method 200, 200'. The Applicant has found that there may be a latent instability in capping performance at an AP, which means that the instability may not show up in the measured path lengths, for example if the number of capping operations is small in relation to the probability that an instability occurs. Turning to FIG. 14B, a latent instability is indicated at AP=110°, where the filled rectangle 71 represents measured path lengths and the open rectangle 71' represents path lengths that would also be measured if the number of capping operations were increased. As indicated by the rectangles 71, since the variability in measured path lengths is low at each of AP=90°, AP=100° and AP=110°, a stable region 70 may be falsely identified by the method 200, 200'. This problem is avoided by validation 400.

In the example of FIG. 13, the validation 400 comprises a step 401 of obtaining the path lengths for the sequence of APs that result in CCP, i.e. APs that have been identified as potentially being included in a stable region. For example, the path lengths may be retrieved from memory 42 in step 401, assuming that measured paths lengths have been stored in the memory 42 during the CMT 10. In step 402, a variability constraint is obtained, for example from memory 42. The variability constraint may be predefined and is designated by AL in FIGS. 14A-14B. The variability constraint AL defines the maximum allowable variability or spread of the measured path lengths obtained in step 401. The variability may be given by any suitable metric and may have a predetermined value. In step 403, the measured path lengths are collectively evaluated in relation to the variability constraint. If the variability of the measured path lengths are within the variability constraint, step 404 proceeds to step 405 and the validation is deemed successful. Otherwise, step 404 proceeds to step 406 and the validation is deemed to fail. As shown in FIG. 9, the outcome of the validation 400 may impact whether the termination condition is fulfilled or not. In FIG. 14A, the validation 400 will be successful, and region 70 will be deemed a stable region. In FIG. 14B, the validation 400 will fail, and region 70 will not be deemed a stable region.

As indicated in FIGS. 14A-14B, the variability constraint AL may be set in view of the changing baseline, BL, which is known and given by the structure of the threads on the cap and the container. Specifically, AL may be set with a margin to the known change in BL for the required number (N) of spatially adjacent APs to be detected within a stable region.

The disclosure is not limited to containers made from sleeves of sheet material but is applicable to any container comprises a threaded neck, which is configured for engagement with a threaded cap.

The invention claimed is:

1. A computer-implemented method of configuring a capping machine which, when configured, is operable to arrange a cap in a given angular position in relation to a neck on a container and to rotate the cap in relation to the neck to fully engage a threaded portion of the cap with a corresponding threaded portion of the neck, said method comprising:

- sequentially selecting an angular position from a predefined set of angular positions of the cap until a termination condition is fulfilled, wherein the angular positions in the predefined set correspond to different orientations of the threaded portion of the cap relative to the threaded portion of the neck,
- operating, for each selected angular position, the capping machine to perform a plurality of capping operations, in which each of a plurality of caps is arranged in the selected angular position and rotated to fully engage with a respective neck on a respective container, and evaluating the plurality of capping operations for consistent capping performance at the selected angular position, wherein the termination condition requires detection of said consistent capping performance for a sequence of adjacent angular positions that correspond to a sequence of spatially adjacent orientations of the threaded portion of the cap relative to the threaded portion of the neck, and wherein said method further comprises: configuring the capping machine by setting the given angular position in relation to the sequence of adjacent angular positions.

2. The method of claim 1, wherein the angular positions in the predefined set span a predefined angular range that corresponds to an angular spacing of one or more threads on the cap.

3. The method of claim 2, wherein the angular positions in the predefined set are mapped to the predefined angular range with equal angular spacing.

4. The method of claim 2, wherein the sequence of adjacent angular positions span an angular subrange of 5%-50% or 10%-40% of the predefined angular range.

5. The method of claim 1, wherein the predefined set comprises a first subset of primary angular positions, and second subset of secondary angular positions which are dispersed intermediate the primary angular positions, wherein the selected angular position is sequentially selected among the primary angular positions in the first subset, said method further comprising:

selecting, when said consistent capping performance is detected at the selected angular position, at least one secondary angular position from the second subset, said at least one secondary angular position being spatially adjacent to the selected angular position, and operating, for each selected secondary angular position, the capping machine to perform a further plurality of capping operations and evaluating the further plurality of capping operations for consistent capping performance at the selected secondary angular position, wherein the termination condition, to detect said consistent capping performance for the sequence of adjacent angular positions, requires detection of said consistent capping performance at each selected secondary angular position.

6. The method of claim 5, wherein the first subset comprises an ordered sequence of primary angular positions, and wherein the selected angular position is sequentially selected from the first subset in accordance with the ordered sequence of primary angular positions.

7. The method of claim 6, wherein the first subset comprises a first sub-sequence of primary angular positions ordered by magnitude, and a second sub-sequence of primary angular positions which are interleaved with the primary angular positions of the first sub-sequence and ordered by magnitude, wherein the second sub-sequence is subsequent to the first sub-sequence in the first subset.

8. The method of claim 5, wherein the predefined set-consists of 4 to 12 primary angular positions.

9. The method of claim 5, wherein the second subset comprises at least one secondary angular position between each pair of spatially adjacent primary angular positions in the first subset.

10. The method of claim 5, wherein the termination condition requires detection of said consistent capping performance at one or more selected secondary angular positions that are smaller than the selected angular position and at one or more selected secondary angular positions that are larger than the selected angular position.

11. The method of claim 1, further comprising: obtaining an input signal indicative of rotation path lengths of the plurality of caps during the plurality of capping operations, wherein the rotation path lengths are evaluated for detection of said consistent capping performance.

12. The method of claim 11, wherein said consistent capping performance is detected when a variability of the rotation path lengths is below a variability threshold.

13. The method of claim 12, wherein said consistent capping performance is further detected when all rotation path lengths are below a length threshold.

14. The method of claim 11, further comprising: evaluating, while operating the capping machine to perform the plurality of capping operations at the selected angular position, the rotation path lengths of the caps in relation to a length threshold, stopping the plurality of capping operations when at least one rotation cap length exceeds the length threshold, and sequentially selecting another angular position from the predefined set.

15. The method of claim 11, further comprising: collectively evaluating, in relation to a variability constraint, the rotation path lengths of the plurality of caps during the plurality of capping operations at each angular position in the sequence of adjacent angular positions, and wherein said termination condition further requires fulfilment of the variability constraint.

* * * * *